United States Patent
Glahn et al.

(10) Patent No.: US 8,256,229 B2
(45) Date of Patent: Sep. 4, 2012

(54) REAR HUB COOLING FOR HIGH PRESSURE COMPRESSOR

(75) Inventors: Jorn A. Glahn, Manchester, CT (US); Peter M. Munsell, Granby, CT (US); Steven B. Johnson, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 40 days.

(21) Appl. No.: 12/757,450

(22) Filed: Apr. 9, 2010

(65) Prior Publication Data

US 2011/0247344 A1    Oct. 13, 2011

(51) Int. Cl.
*F02C 6/08* (2006.01)

(52) U.S. Cl. ......... 60/782; 60/785; 60/39.83; 60/728; 60/806

(58) Field of Classification Search ......... 60/728, 60/806, 785, 782
See application file for complete search history.

(56) References Cited

U.S. PATENT DOCUMENTS

| | | | |
|---|---|---|---|
| 4,055,946 A | 11/1977 | Sens | |
| 4,793,772 A | 12/1988 | Zaehring et al. | |
| 4,808,073 A | 2/1989 | Zaehring et al. | |
| 5,209,633 A | 5/1993 | McGreehan et al. | |
| 5,292,227 A * | 3/1994 | Czachor et al. | 415/209.3 |
| 5,392,614 A | 2/1995 | Coffinberry | |
| 5,414,992 A * | 5/1995 | Glickstein | 60/782 |
| 6,050,080 A | 4/2000 | Horner | |
| 6,134,880 A | 10/2000 | Yoshinaka | |
| 6,250,061 B1 | 6/2001 | Orlando | |
| 6,612,114 B1 * | 9/2003 | Klingels | 60/785 |
| 6,722,138 B2 | 4/2004 | Soechting et al. | |
| 7,124,590 B2 | 10/2006 | Hoff et al. | |
| 7,162,876 B2 | 1/2007 | Hoff et al. | |

* cited by examiner

*Primary Examiner* — Ehud Gartenberg
*Assistant Examiner* — Steven Sutherland
(74) *Attorney, Agent, or Firm* — Carlson, Gaskey & Olds, P.C.

(57) ABSTRACT

In one exemplary embodiment, a gas turbine engine includes a turbine and a high pressure compressor. The high pressure compressor includes a last stage having a last stage compressor blade and a last stage vane. The gas turbine engine includes a first flow path through which bleed air flows to the turbine and a second flow path through which air from the last stage of the high pressure compressor flows. The bleed air in the first flow path exchanges heat with a portion of the air in the second flow path in a heat exchanger to cool the air in the second flow path. The cooled air in the second flow path is returned to the high pressure compressor to cool the high pressure compressor.

20 Claims, 4 Drawing Sheets

US 8,256,229 B2

REAR HUB COOLING FOR HIGH PRESSURE COMPRESSOR

BACKGROUND OF THE INVENTION

This application relates generally to a system for cooling a rear hub and a rear rim of a high pressure compressor of a gas turbine engine.

In a prior gas turbine engine or a high performance aero-engine gas generator, cool bleed air flows radially inwardly from a casing to cool a mid turbine frame and a low pressure turbine. The air is then exhausted.

Due to material limitations of prior gas turbine engines, the pressure and the rotational speed of the gas turbine engine does not exceed a threshold. Therefore, a last stage of a high pressure compressor of the gas turbine engine does not need to be cooled.

SUMMARY OF THE INVENTION

In one exemplary embodiment, a gas turbine engine includes a turbine and a high pressure compressor. The high pressure compressor includes a last stage having a last stage compressor blade and a last stage vane. The gas turbine engine includes a first flow path through which bleed air flows to the turbine and a second flow path through which air from the last stage of the high pressure compressor flows. The bleed air in the first flow path exchanges heat with the air in the second flow path in a heat exchanger to cool the air in the second flow path. The cooled air in the second flow path is returned to the high pressure compressor to cool a portion of the high pressure compressor.

In another exemplary embodiment, a gas turbine engine includes a high pressure compressor having a last stage including a last stage compressor blade and a last stage vane. The gas turbine engine includes a turbine including a mid turbine frame and a low pressure turbine. The gas turbine engine includes a first flow path through which bleed air flows to the mid turbine frame and the low pressure turbine, and a second flow path through which air from the last stage of the high pressure compressor flows. The gas turbine engine also includes a heat exchanger. The bleed air in the first flow path exchanges heat with the air in the second flow path to cool the air in the second flow path. The cooled air in the second flow path is returned to the high pressure compressor to cool a portion of the high pressure compressor.

In another exemplary embodiment, a method of cooling a portion of a high pressure compressor of a gas turbine engine includes the steps of flowing bleed air to a turbine through a first flow path and flowing air from a last stage of a high pressure compressor along a second flow path, the last stage including a last stage compressor blade and a last stage vane. The method further includes the steps of exchanging heat between the bleed air in the first flow path and the air in the second flow path to cool the air in the second flow path and returning the cooled air in the second flow path to the high pressure compressor to cool the portion of the high pressure compressor.

These and other features of the present invention can be best understood from the following specification and drawings, the following of which is a brief description.

DETAILED DESCRIPTION OF THE PREFERRED EMBODIMENT

Figure 1:
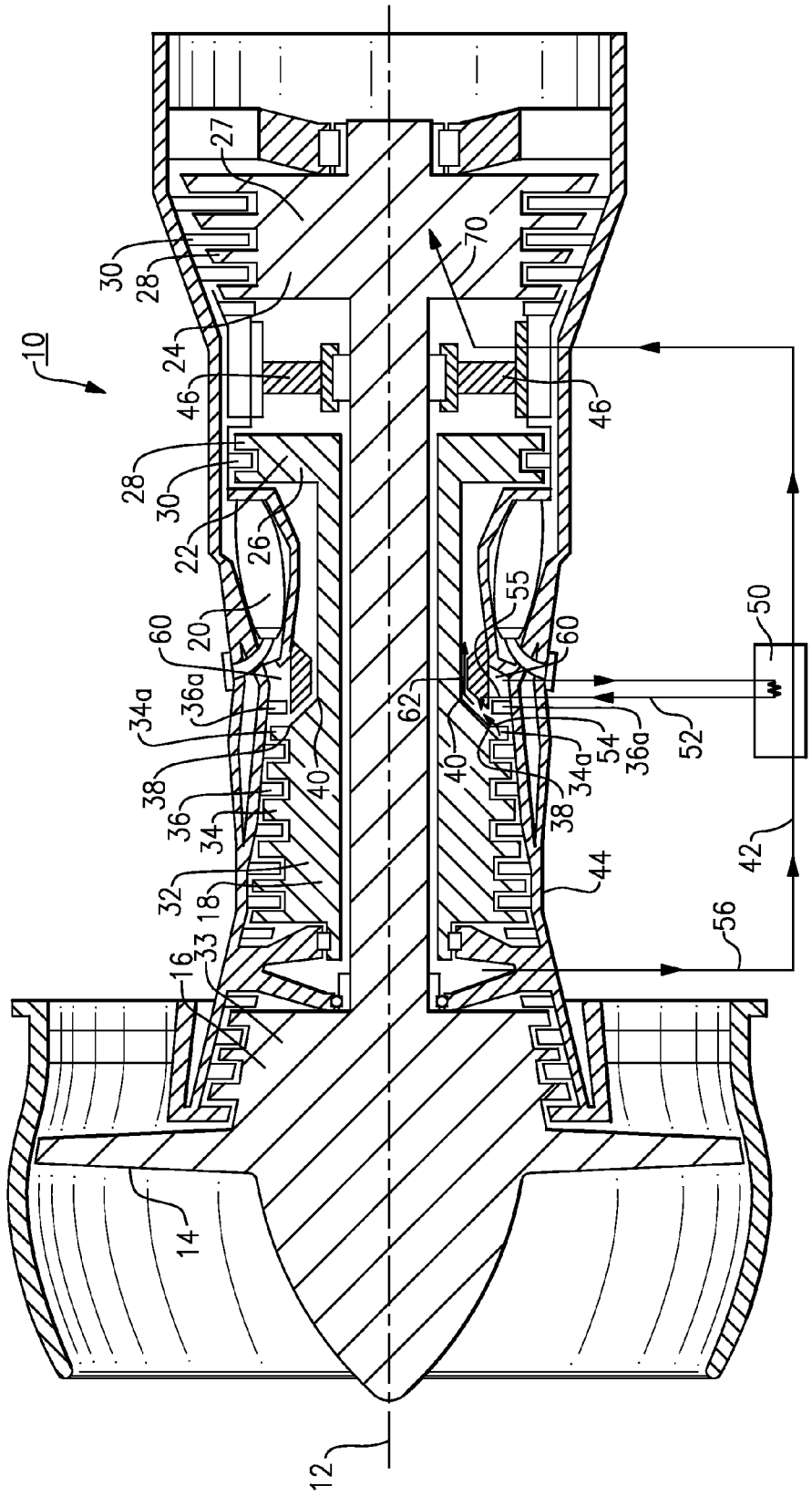
FIG. 1 illustrates a simplified cross-sectional view of an example gas turbine engine.

As shown in FIG. 1, a gas turbine engine 10, such as a turbofan gas turbine engine or a high performance aero-engine gas generator, is circumferentially disposed about an engine centerline (or axial centerline axis 12). The gas turbine engine 10 includes a fan 14, a low pressure compressor 16, a high pressure compressor 18, a combustion section 20, a high pressure turbine 22, and a low pressure turbine 24. This application extends to engines without a fan, and with more or fewer sections. As is well known in the art, air is compressed in the low pressure compressor 16 and the high pressure compressor 18, mixed with fuel and burned in the combustion section 20, and expanded in high pressure turbine 22 and the low pressure turbine 24.

The high pressure compressor 18 and the low pressure compressor 16 include rotors 32 and 33, respectively, which rotate, driving the high pressure compressor 18, and the low pressure compressor and the fan 14, respectively. The high pressure compressor 18 and the low pressure compressor include alternating rows of metal rotating airfoils or rotating compressor blades 34 and static airfoils or static vanes 36. A rear rim 38 is the outer most portion of the rotor 32 of the high pressure compressor 18. A rear hub 40 is a conical piece of the rotor 32.

The high pressure turbine 22 and the low pressure turbine 24 each include rotors 26 and 27, respectively, which rotate in response to the expansion, driving the low pressure compressor 16 and the high pressure compressor 18 and the fan 14. The high pressure turbine 22 and the low pressure turbine 24 each include alternating rows of metal rotating airfoils or turbine blades 28 and static airfoils or static vanes 30.

It should be understood that this view is included simply to provide a basic understanding of the sections of a gas turbine engine 10 and not to limit the invention. This invention extends to all types of gas turbine engines 10 for all types of applications.

Recent developments in technologies for gas turbine engines 10 have resulted in the need for new materials that are able to withstand higher temperatures, pressures, etc. The high pressure compressor 18 made of the new materials has a pressure ratio of 48, a temperature capacity of approximately 1300° F. (704° C.), and rotates at rim speeds in excess of 1400 feet per second (427 meters per second), which are higher than the corresponding values of the prior gas turbine engines.

The high pressure rise of the high pressure compressor 18 generate high temperatures, especially at the last stage of the high pressure compressor 18. In one example, the last stage of the high pressure compressor 18 is the eighth stage. The last stage of the high pressure compressor 18 is an area of the gas turbine engine 10 that includes the location of the connection of the last stage rotating compressor blade 34a to the rotor 32, the adjacent static vane 36a, and the rear rim 38. The recent developments in gas turbine engines technologies have resulted in thermal and mechanical stresses at the last stage of the high pressure compressor 18 that challenge or exceed the capabilities of the materials.

Figure 2:
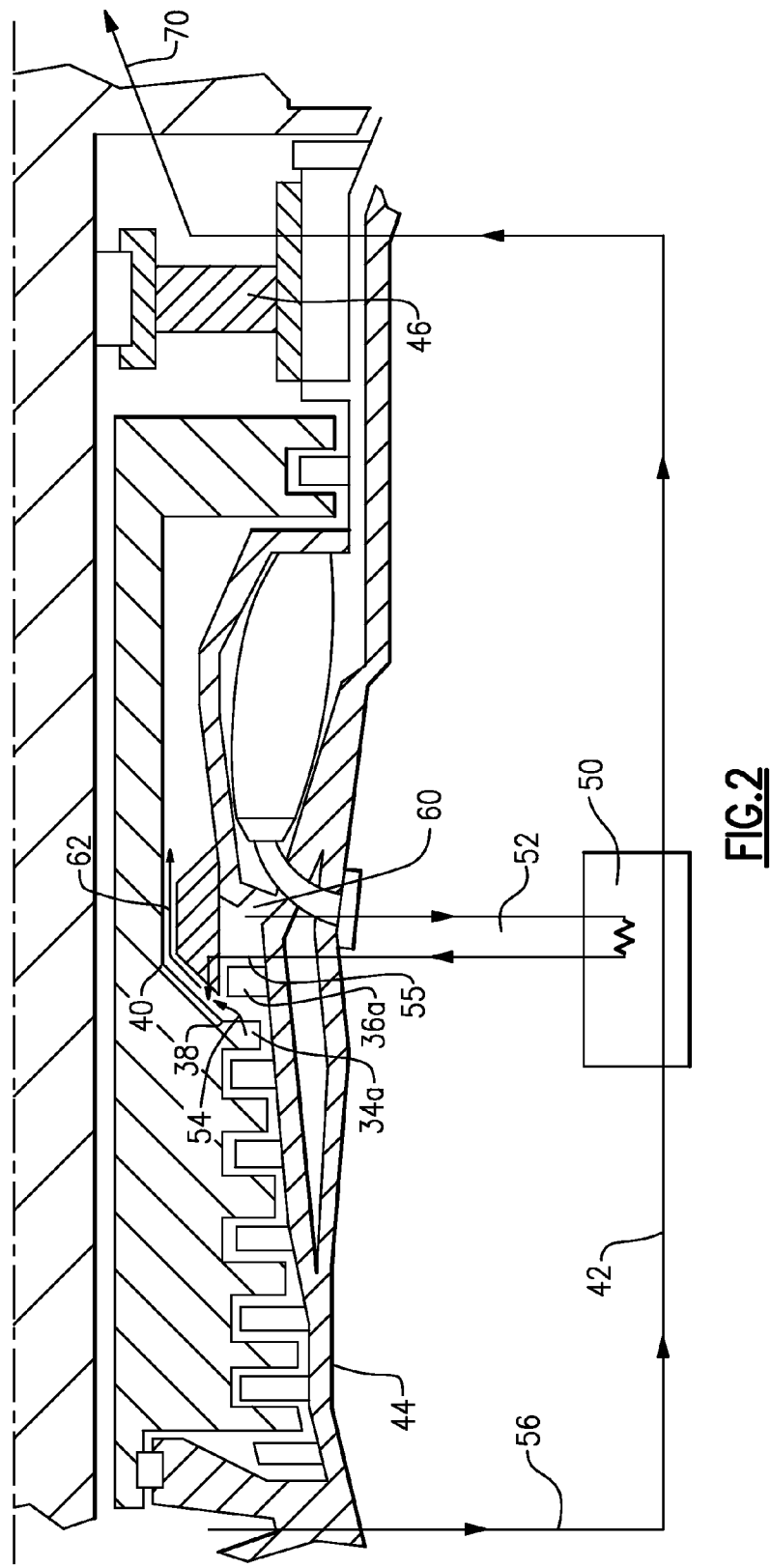
FIG. 2 illustrates a view of a section of the example gas turbine engine of FIG. 1.

In the gas turbine engine 10, relatively cool bleed air from an early stage of the high pressure compressor 18 of the gas turbine engine 10 flows through a high pressure compressor bleed manifold 56 and is directed through four bleed pipes 42 (only one is shown in FIGS. 1 and 2 for simplicity, and all four bleed pipes 42 are shown in FIGS. 3 and 4) located outside a casing 44. The cool bleed air is directed to a mid turbine frame 46 and the low pressure turbine 24 to absorb heat from the mid turbine frame 46 and the low pressure turbine 24, therefore cooling these components. The mid turbine frame 46 provides support for the rotor 27. The heated bleed air is then exhausted into a main gas path 70.

A cooling system according to the present invention cools the rear rim 38 and the rear hub 40 of the last stage of the high pressure compressor 18. The cooling system is integrated with the cooling system including the bleed pipes 42 that transport bleed air that cools the mid turbine frame 46 and the low pressure turbine 24. The cooling system is a passive system that results in no negative performance impact. The cooling system could also decouple stress limitations of the high pressure compressor 18 from further thermodynamic cycle optimizations.

Air from a diffuser case 60 located downstream of the compressor exit is directed through four high pressure compressor pipes 52. A heat exchanger 50 is integrated on each bleed pipe 42. In the heat exchanger 50, the fluid flowing through the high pressure compressor pipes 52 from the diffuser case 60 exchanges heat with bleed air flowing through the bleed pipes 42 that is directed to the mid turbine frame 46 and the low pressure turbine 24. The flow rate of the cooler bleed air is about four times than the flow rate of the hotter air from the high pressure compressor 18. The flow and temperature boundary conditions on the hot and cold sides translate into a heat exchanger 50 effectiveness of less than 0.5, which means that the heat exchanger 50 size can be relatively small.

An airstream 62 is used to ventilate and cool the rear hub 40 of the high pressure compressor 18. The airstream 62 is the sum of flow through paths 55 and 54. The air that flows through the path 55 is drawn from the diffuser case 60 and directed to the heat exchanger 50 to be cooled ($\Delta T$) approximately 200° F. (111° C.). The air flows through the heat exchanger 50 and exchanges heat with the cooler bleed air flowing through the bleed pipes 42. The air is then directed to the rear rim 38. The other path 54 is un-cooled and represents the conventional rim ventilation source. Air flow through the path 54 is bled from the inner diameter of the gas path between the blade 34*a* and the vane 36*a* into the rear rim 38, where it is combined with the fluid in the path 55. The resulting rim cavity air is cooled 100° F. (55° C.) compared to the uncooled baseline, allowing the rear rim 38 and the rear hub 40 to be cooled ($\Delta T$) by as much as 100° F. (55° C.). Therefore, by mixing cooled air in the path 55 at the rear rim 38 of the high pressure compressor 18, the life of the gas turbine engine 10 can be increased.

The air in the airstream 62 is exhausted downstream of the rear hub 40 into the turbine cooling system and cools the hotter sections of the gas turbine engine 10, such as the high pressure turbine 22.

After flowing through the heat exchangers 50, the fluid in the bleed pipes 42 is directed to the mid turbine frame 46 and the low pressure turbine 24. Based upon the mass flow ratio of cooling air to hot air, the 200° F. (111° C.) temperature reduction of the hot air in the path 55 results in an approximately 50° F. (28° C.) temperature increase of the cooling air in the bleed pipes 42. Therefore, the mid turbine frame 46 and the low pressure turbine 24 are up to 50° F. (28° C.) warmer ($\Delta T$) than a system that does not employ the heat exchanger 50.

Figure 3A:
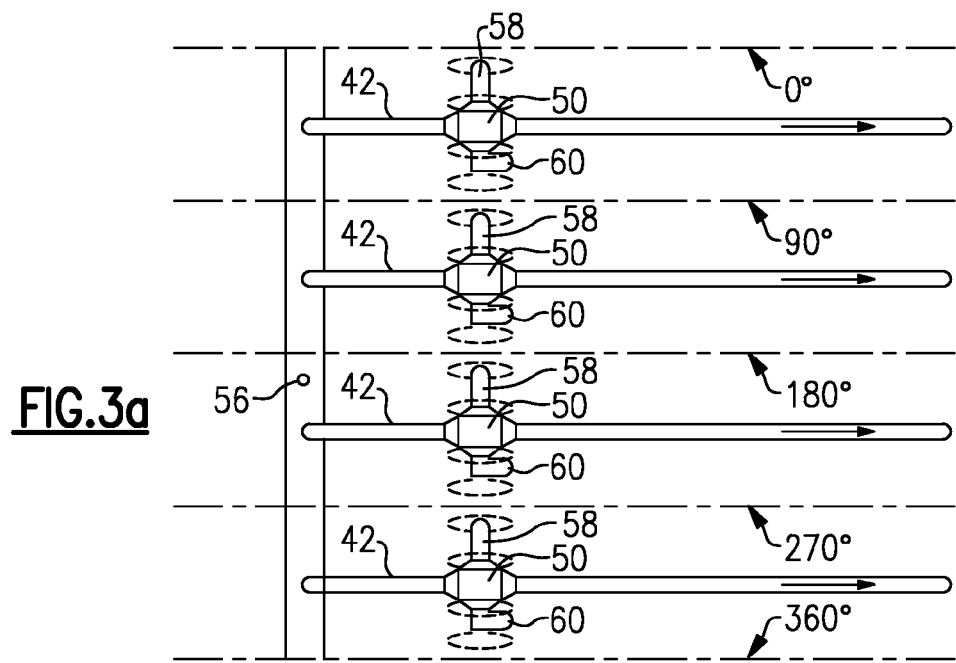
FIG. 3A illustrates a first example cooling system including a single strut.
Figure 3B:
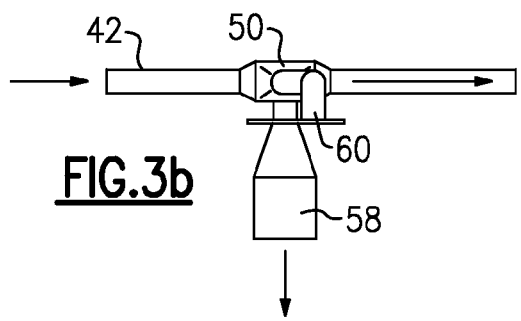
FIG. 3B illustrates a section of the cooling system of FIG. 3A.

In one example, as shown in FIGS. 3A and 3B, the four bleed pipes 42 are in fluid communication with a pressure compressor bleed manifold 56. The fluid in each high pressure compressor pipe 52 is fed through a bleed port of the diffuser case 60 and into the heat exchanger 50. In one example, the heat exchanger 50 is a plate fin heat exchanger. After exchanging heat with the bleed air in the bleed pipes 42, the cooled air exits the heat exchanger 50 through a strut 58 and cools the rear rim 38 and the rear hub 40. The struts 58 are integrated with the high pressure compressor pipes 52. As shown in FIG. 3A, the four bleed pipes 42 are angularly spaced relative to the high pressure compressor bleed manifold 56 and spaced 90° apart in a circumferential direction. In this example, the flow of fluid through the heat exchanger 50 is substantially parallel to the diffuser case 60.

Figure 4A:
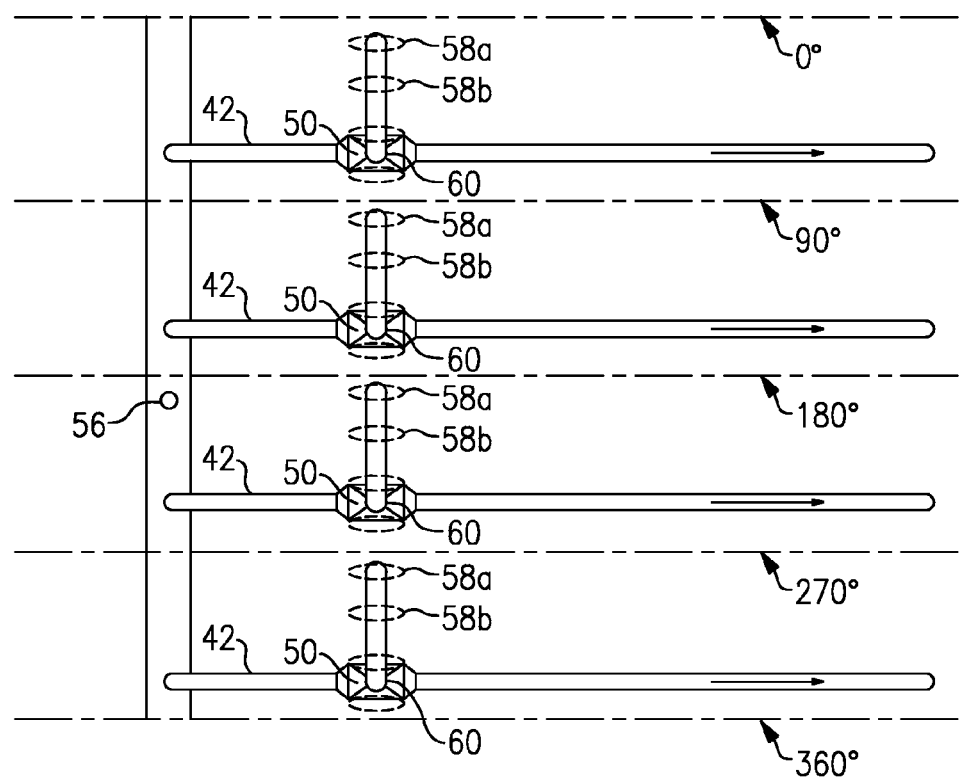
FIG. 4A illustrates a second example cooling system including two struts.
Figure 4B:
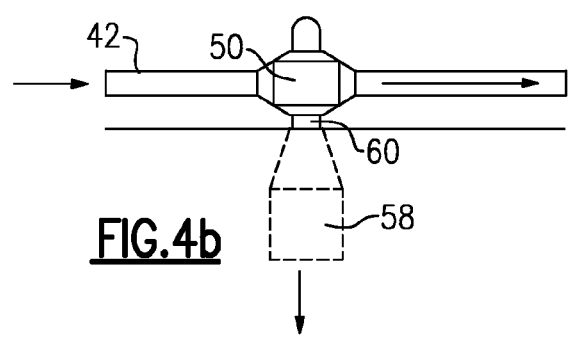
FIG. 4B illustrates a section of the cooling system of FIG. 4A.

In another example shown in FIGS. 4A and 4B, the four bleed pipes 42 are in fluid communication with a high pressure compressor bleed manifold 56. The fluid in each high pressure compressor pipe 52 is fed through a bleed port of the diffuser case 60 and into the heat exchanger 50. In one example, the heat exchanger 50 is a plate fin heat exchanger. After exchanging heat with the bleed air in the bleed pipes 42, the cooled air exits the heat exchanger 50 through two struts 58*a* and 58*b* and cools the rear rim 38 and the rear hub 40. This results in a lower pressure drop, which increases the pressure drop available across the heat exchanger 50 and could result in a smaller size heat exchanger. As shown in FIG. 4A, the four bleed pipes 42 are angularly spaced relative to the high pressure compressor bleed manifold 56 and spaced 90° apart in a radial direction. Therefore, the bleed pipes 42 each include a right angle bend that allows the pipes 42 to extend in a circumferential direction, as in the example of FIGS. 3A and 3B. In this example, the flow of fluid through the heat exchanger 50 is substantially perpendicular to the diffuser case 60. In another example, the heat exchanger 50 is mounted directly on the bleed port of the diffuser case 60. The struts 58*a* and 58*b* and the diffuser case 60 extend in the same axial direction.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A gas turbine engine comprising:
   a high pressure compressor including a last stage having a last stage compressor blade and a last stage vane;
   a turbine;
   a first flow path, wherein bleed air flows to the turbine through the first flow path, and the first flow path includes a plurality of pipes;
   a second flow path, wherein air downstream of the high pressure compressor flows along the second flow path; and
   a heat exchanger, wherein the bleed air in the first flow path exchanges heat with the air in the second flow path to cool the air in the second flow path to cooled air, and the cooled air in the second flow path is returned to the high pressure compressor to cool a portion of the high pressure compressor, wherein the heat exchanger is located on each of the plurality of pipes, wherein a portion of the air enters the heat exchanger through a diffuser case and exits the heat exchanger through a strut, wherein a flow of the portion of the air through the heat exchanger is substantially parallel to the diffuser case.

2. The gas turbine engine as recited in claim 1 wherein the portion of the high pressure compressor includes a rear rim and a rear hub, an outermost portion of a compressor rotor includes the rear rim, and the rear hub is substantially conical and located near the rear rim.

3. The gas turbine engine as recited in claim 1 wherein the turbine includes a mid turbine frame and a low pressure turbine, and the bleed air in the first flow path cools the mid turbine frame and the low pressure turbine.

4. The gas turbine engine as recited in claim 1 wherein the plurality of pipes are angularly spaced and extend in a circumferential direction.

5. The gas turbine engine as recited in claim 1 wherein the bleed air is bled from an early stage of the high pressure compressor.

6. The gas turbine engine as recited in claim 1 wherein the air downstream of the high pressure compressor is from the diffuser case.

7. The gas turbine engine as recited in claim 1 wherein the air in the second flow path is combined with air in a rim ventilation source bled from the last stage of the high pressure compressor to define a path of combined air that is employed to ventilate and cool a rear hub of the high pressure compressor.

8. The gas turbine engine as recited in claim 1 wherein the portion of the high pressure compressor includes the last stage.

9. A gas turbine engine comprising:
a high pressure compressor including a last stage having a last stage compressor blade and a last stage vane;
a turbine including a mid turbine frame and a low pressure turbine;
a first flow path, wherein bleed air flows to the turbine though the first flow path to cool the mid turbine frame and the low pressure turbine;
a second flow path, wherein air downstream of the high pressure compressor flows along the second flow path; and
a heat exchanger, wherein the bleed air in the first flow path exchanges heat with the air in the second flow path to cool the air in the second flow path to cooled air, and the cooled air in the second flow path is returned to the high pressure compressor to cool a portion of the high pressure compressor,
wherein the air in the second flow path flows directly from downstream of the high pressure compressor to the heat exchanger and then directly from the heat exchanger to the portion of the high pressure compressor,
wherein a portion of the air enters the heat exchanger through a diffuser case and exits the heat exchanger through a strut, and a flow of the portion of the air through the heat exchanger is substantially parallel to the diffuser case.

10. The gas turbine engine as recited in claim 9 wherein the portion of the high pressure compressor includes a rear rim and a rear hub, an outermost portion of a compressor rotor includes the rear rim, and the rear hub is substantially conical and located near the rear rim.

11. The gas turbine engine as recited in claim 9 wherein the bleed air is bled from an early stage of the high pressure compressor.

12. The gas turbine engine as recited in claim 9 wherein the air downstream of the high pressure compressor is from the diffuser case.

13. The gas turbine engine as recited in claim 9 wherein the air in the second flow path is combined with air in a rim ventilation source bled from the last stage of the high pressure compressor to define a path of combined air that is employed to ventilate and cool a rear hub of the high pressure compressor.

14. The gas turbine engine as recited in claim 9 wherein the portion of the high pressure compressor includes the last stage.

15. A method of cooling a portion of a high pressure compressor of a gas turbine engine, the method comprising the steps of:
flowing bleed air to a turbine through a first flow path;
directly flowing air from downstream of a high pressure compressor along a second flow path to a heat exchanger, wherein a last stage includes a last stage compressor blade and a last stage vane, wherein a portion of the air enters the heat exchanger through a diffuser case and exits the heat exchanger through a strut, and a flow of the portion of the air through the heat exchanger is substantially parallel to the diffuser case;
exchanging heat between the bleed air in the first flow path and the air in the second flow path in the heat exchanger to cool the air in the second flow path to cooled air; and
directly returning the cooled air in the second path from the heat exchanger to the high pressure compressor to cool a portion of the high pressure compressor.

16. The method as recited in claim 15 wherein the step of flowing the bleed air to a turbine includes flowing the bleed air from an early stage of the high pressure compressor.

17. The method as recited in claim 15 wherein the step of directly flowing the air from downstream of the high pressure compressor includes flowing air from the diffuser case.

18. The method as recited in claim 15 wherein the step of directly returning the cooled air to cool the portion of the high pressure compressor includes returning the cooled air to a rear hub and a rear rim, and an outermost portion of a compressor rotor includes the rear rim, and the rear hub is substantially conical and located near the rear rim.

19. The method as recited in claim 15 including the steps of combining the cooled air with air in a rim ventilation source bled from the last stage of the high pressure compressor to define a path of combined air and employing the path of combined air to ventilate and cool a rear hub of the high pressure compressor.

20. The method as recited in claim 15 wherein the step of directly returning the cooled air in the second path from the heat exchanger to the high pressure compressor includes returning the cooled air to the last stage of the high pressure compressor.

* * * * *